US008538269B2

(12) United States Patent
Blanton et al.

(10) Patent No.: US 8,538,269 B2
(45) Date of Patent: Sep. 17, 2013

(54) DMM WIRELESS ADAPTER

(75) Inventors: Robin Blanton, Grosse Ile, MI (US); Roger Leon Van Elslander, Warren, MI (US); Anthony B. Vink, Plymouth Township, MI (US); Mark P. Zachos, West Bloomfield, MI (US)

(73) Assignee: Dearborn Group, Inc., Farmington Hills, MI (US)

( * ) Notice: Subject to any disclaimer, the term of this patent is extended or adjusted under 35 U.S.C. 154(b) by 335 days.

(21) Appl. No.: 12/806,603

(22) Filed: Aug. 17, 2010

(65) Prior Publication Data

US 2012/0045988 A1 Feb. 23, 2012

(51) Int. Cl.
*H04B 10/00* (2013.01)

(52) U.S. Cl.
USPC ............... 398/115; 398/9; 398/116; 398/118; 455/39; 455/73

(58) Field of Classification Search
USPC ............... 398/9–38, 118–133, 106, 107, 109, 398/115, 116; 455/39, 73, 67.11
See application file for complete search history.

(56) References Cited

U.S. PATENT DOCUMENTS

| 5,387,994 A | * | 2/1995 | McCormack et al. | 398/117 |
| 5,914,796 A | * | 6/1999 | Selin | 398/118 |
| 6,336,126 B1 | * | 1/2002 | Bjorklund et al. | 708/139 |
| 6,501,581 B1 | * | 12/2002 | Snyder et al. | 398/129 |
| 6,754,451 B1 | * | 6/2004 | Nakamura | 398/135 |
| 7,369,945 B2 | * | 5/2008 | Miller et al. | 702/24 |

* cited by examiner

*Primary Examiner* — M. R. Sedighian
(74) *Attorney, Agent, or Firm* — Warn Partners, P.C.

(57) ABSTRACT

The present invention is an adapter for providing wireless communication between a digital multimeter (DMM) and a computer. The adapter has a processor as well as a transmitter operable for transmitting signals to the (DMM) from the processor. The adapter also includes a receiver operable for receiving signals from the DMM, the processor is able to receive the signals from the receiver. The adapter of the present invention also includes at least one radio transmitter operable for providing wireless communication between the processor and the computer. The data measurements obtained through communication with the DMM via the receiver and transmitter are transferred wirelessly to the adapter. The data measurements obtained by the adapter are then transferred wirelessly from the adapter to the computer through the radio transmitter. The radio transmitter is operable to communicate wirelessly with the computer in one or more communication protocols, such as Zigbee and WiFi.

19 Claims, 3 Drawing Sheets

DMM WIRELESS ADAPTER

GOVERNMENT RIGHTS

This invention was made with Government support under contract W31P4Q-05-A-0017/0006 awarded by the U.S. Army Aviation and Missile Contracting Center. The Government has certain rights in the invention.

FIELD OF THE INVENTION

The present invention relates to wireless digital multimeter used with a protocol adapter for wirelessly transferring information between a device under test and a computer.

BACKGROUND OF THE INVENTION

A multimeter or a multitester, also known as a volt/ohm meter or VOM, is an electronic measuring instrument that combines several measurement functions into one device. A typical multimeter may include features such as the ability to measure voltage, current, and resistance. There are two main categories of multimeters, they are typically digital multimeters (DMM) and analog multimeters.

Modern multimeters are often digital due to their accuracy, durability, and extra features. In regard to a DMM, the signal under test is converted to a voltage, and an amplifier with electronically controlled gain preconditions the signal. A DMM displays the quantity measured as a number, which prevents parallax errors.

A DMM may be a hand-held device useful for basic fault finding and field service work, or a bench instrument which can measure to a very high degree of accuracy. The DMM is used to troubleshoot electrical problems in a wide array of industrial and household devices such as batteries, motor controls, appliances, power supplies, and wiring systems.

Hand-held DMMs use a battery or batteries for continuity and resistance readings at the very least, and the battery may also power a DMM or an amplifier in an FET-VOM. This allows the DMM to test a device that is disconnected from a main power source, by supplying its own low voltage for the test. It is one of the most important safety features of the DMM. A 1.5 volt AA battery is typical; more sophisticated meters with added capabilities additionally use a 9 volt battery for some types of readings, or higher-voltage batteries for higher resistance testing. DMMs intended for testing in hazardous locations or for use on blasting circuits may require use of a manufacturer-specified battery to maintain their safety rating.

Modern DMMs may have an embedded computer, which provides a wealth of convenience features. Modern DMMs are often interfaced with a personal computer by RS-232 connections, USB, or an instrument bus such as IEEE-488. The interface allows the computer to record measurements as they are made. Some DMM's can store measurements and upload them to a computer.

However, using an actual wire connection between a DMM and a computer, such as an RS-232 or USB, is limited because the DMM and device under test must be in close proximity to the computer because of the wire connection. This limits the use of a DMM when it is physically impossible to have the device under test in proximity to the computer such that the wire connection can be made between the DMM and the computer.

Accordingly, there exists a need for a DMM which is able to record desired measurements or parameters of a device under test, and communicate wirelessly with a computer, allowing the computer to record the measurements or parameters.

SUMMARY OF THE INVENTION

The present invention is an adapter for providing wireless communication between a digital multimeter (DMM) and a computer. The adapter of the present invention includes a processor as well as a transmitter operable for transmitting signals to the (DMM) from the processor. The adapter of the present invention also includes a receiver operable for receiving signals from the DMM, the processor is able to receive the signals from the receiver.

The adapter of the present invention also includes at least one radio transmitter operable for providing wireless communication between the processor and the computer. The data measurements obtained through communication with the DMM via the receiver and transmitter are transferred wirelessly to the adapter. The data measurements obtained by the adapter are then transferred wirelessly from the adapter to the computer through the use of the radio transmitter.

The radio transmitter is operable to communicate wirelessly with the computer in one or more communication protocols. Such examples of various communication protocols include, but are not limited to, Zigbee, WiFi, Infrared Data Association (IrDA), Bluetooth, Ultra-wideband (UWA), and Z-Wave.

In an alternate embodiment, the present invention includes two radio transmitters, each of which may broadcast in the same communication protocol, or each of the radio transmitters may broadcast in different communication protocols.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
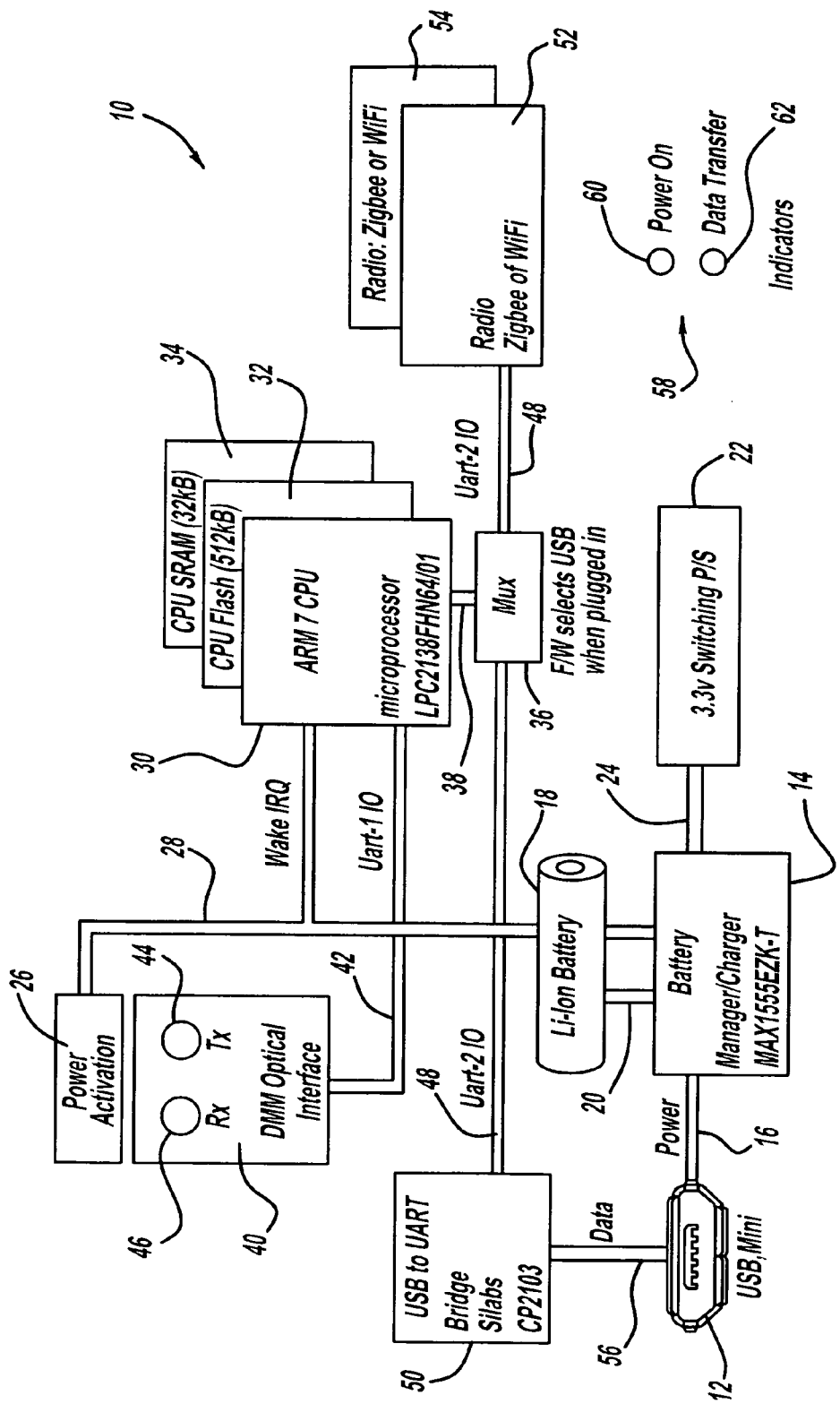
FIG. 1 is a schematic showing the various components of an adapter for providing wireless communication between a DMM and a computer, according to the present invention.

A schematic for an adapter for use with a digital multimeter (DMM) is shown in FIG. 1 generally at 10. The adapter is able to wirelessly communicate with a DMM used for detecting current, voltage, resistance, or the like. The adapter also has a Universal Serial Bus (USB) connector 12 which is used for connecting the adapter to a device for charging or for updating the software of the adapter. The connector 12 is in electrical communication with a battery manager/charger 14 through the use of a first power line 16; the battery manager/charger 14 is in electrical communication with a power source, which in this embodiment is a battery 18, through the use of a second power line 20, and a power supply switch 22 through the use of a third power line 24. The battery 18 is charged when the USB connector 12 is plugged into a device capable of providing a suitable battery charge. The battery manager/charger 14 is also in electrical communication with a power activation switch 26 through the use of a wake interrupt request (IRQ) line 28.

The wake IRQ line 28 also branches off to place the power activation switch 26 and battery manager/charger 14 in electrical communication with a processor 30. In this embodiment, the processor is a 32-bit Advanced RISC Machine (ARM) processor 30 (the acronym RISC stands for Reduced Instruction Set Computer). The processor 30 has both flash memory 32 as well as Static Random Access Memory (SRAM) 34. The processor 30 is in electrical communication with a multiplexer 36 through the use of a data communication line 38, and a DMM optical interface 40 through the use of a first Universal Asynchronous Receive/Transmit (UART) line 42. The interface 40 includes both a transmitter 44 and a receiver 46 for providing wireless communication with a DMM.

The multiplexer 36 is able to communicate through the use of a second UART line 48 with a USB to UART Bridge 50. The second UART line 48 also extends from the multiplexer 36 to at least one radio transmitter 52, the data communication line 38 is also part of the second UART line 48. However, in this embodiment, there is a first radio transmitter 52 and a second radio transmitter 54. Both transmitters 52,54 have the capability to transmit in both Zigbee and WiFi communication protocols for providing communication with a computer. The USB to UART Bridge 50 is in electrical communication with the connector 12 by way of a data communication line 56; the USB to UART Bridge 50 provides a conversion function to convert information received from the USB connector 12 to be suitable to transfer across the second UART line 48.

Also shown in FIG. 1 is a plurality of indicators, shown generally at 58. There is a first indicator 60 for providing an indication that the power is on or off, and a second indicator 62 for providing an indication that data is being transferred to or from the adapter.

Figure 2:
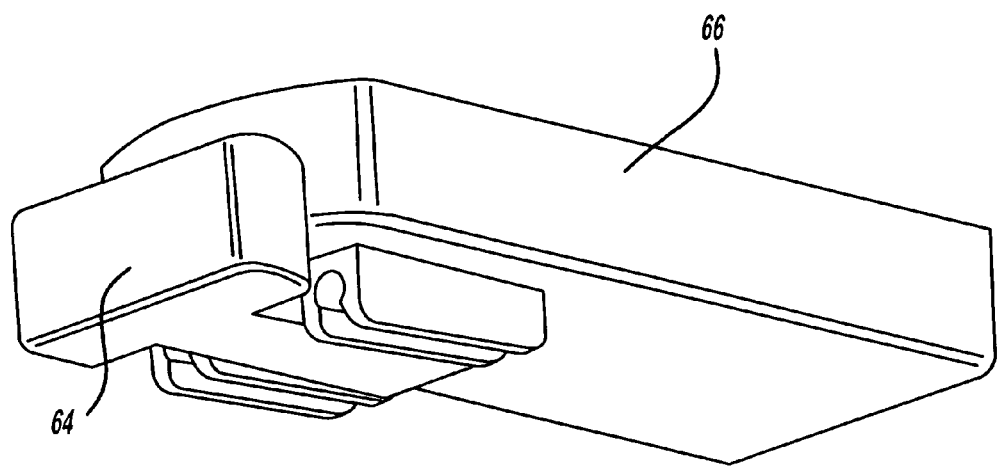
FIG. 2 is an adapter connected to a load box, the adapter for providing wireless communication between a DMM and a computer, according to the present invention.

Referring to FIG. 2, an adapter 64 according to the present invention is connected to a device providing a charging function, or for reprogramming the adapter; the device is a load box 66. When connected to the load box 66, the battery charger/manager 14 controls the charge delivered to the battery 18, and the adapter 64 is operable to be reprogrammed, or updated with different software, if desired. The battery 18 used in the adapter 64 of the present invention is a lithium-ion battery which is able to retain charge for thirty days when not in use (stand-by mode), and is capable of four hours of continuous operation when in use (active mode).

Figure 3:
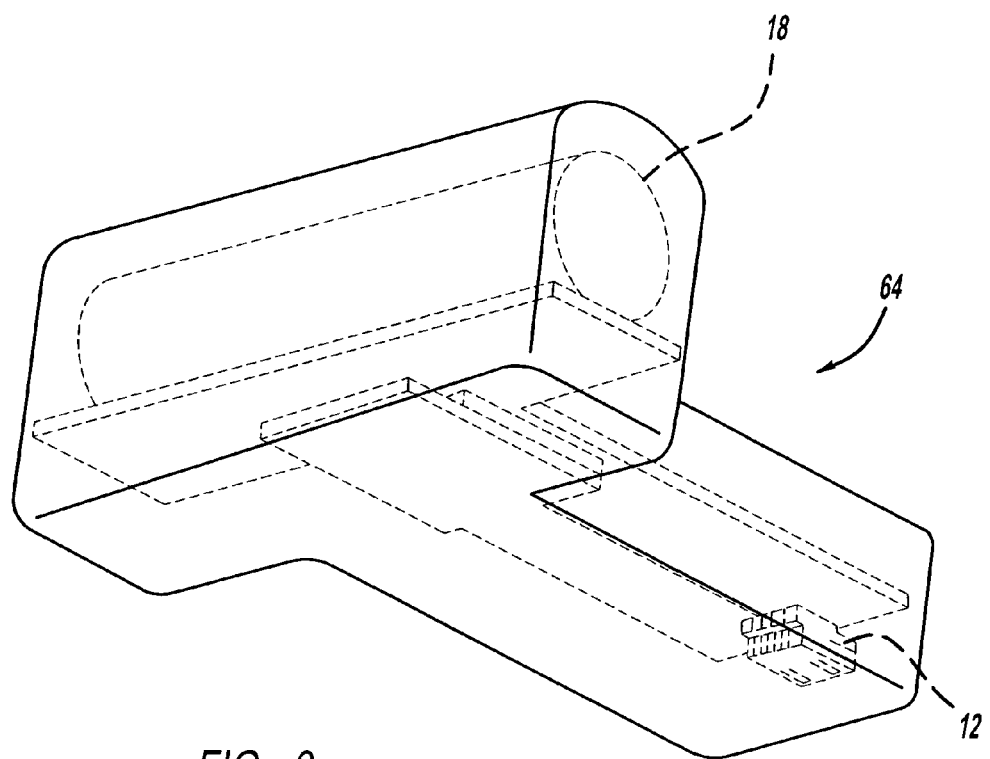
FIG. 3 is a perspective view of an adapter for providing wireless communication between a DMM and a computer, according to the present invention.
Figure 4:
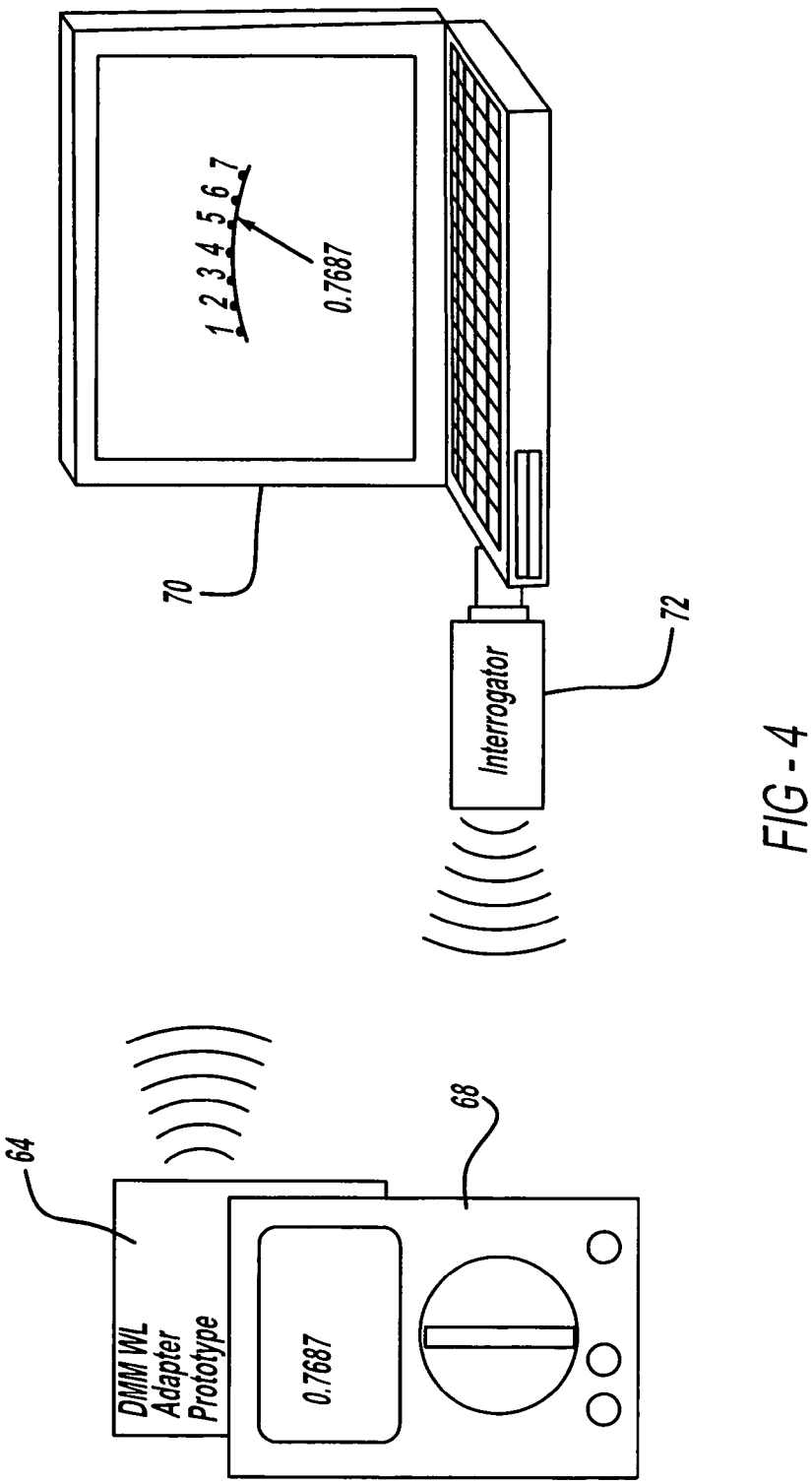
FIG. 4 is a perspective view of an adapter in wireless communication with a digital multimeter, and in wireless communication with a computer, according to the present invention.

Referring to FIGS. 3-4, the adapter 64 is able to communicate wirelessly with a digital multimeter (DMM) 68. The receiver 46 and the transmitter 44 are used to communicate with the DMM 68, and receive data obtained by the DMM 68.

Additionally, the wireless communication provided by the adapter 64 allows the DMM 68 to communicate wirelessly with any remotely located computer 70, such as a desktop computer, laptop computer, or the like. The computer 70 has an interrogator 72 which is operable to receive and transmit signals between the radio transmitters 52,54, and then deliver and receive the signals to and from the computer 70, allowing the DMM 68 to communicate wirelessly with the computer 70.

In operation, the adapter 64 is in a dormant or inactive state when not in use, where minimal power is used from the battery 18 to power the adapter such that the receiver 46 is able to detect a signal received from the DMM 68. The power activation switch 26 interacts with the DMM optical interface 40 in such a manner that if the receiver 46 detects a signal from the DMM 68, the switch 26 activates the processor 30, thereby activating the adapter 64. The DMM 68 is a commercial, off the shelf DMM, such as the Agilent U1252A™ DMM. The processor 30 then begins to communicate with the DMM optical interface 40 through the first UART line 42. As the adapter 64 receives signals from the DMM 68, the processor 30 sends the signals to the radio transmitters 52,54 through the multiplexer 36 and second UART line 48.

Once the radio transmitters 52,54 receive the signals from the processor 30, the transmitters 52,54 broadcast the signal and the interrogator 72 receives the signal. While the transmitters 52,54 used with the adapter 64 of the present invention broadcast in either Zigbee or WiFi communication protocols, it is within the scope of the invention that other communication protocols may be used. Other communication protocols include, but are not limited to, Infrared Data Association (IrDA), Bluetooth, Ultra-wideband (UWA), and Z-Wave. Additionally, the transmitters 52,54 are also operable to broadcast in different communication protocols. For example, in one embodiment the first transmitter 52 broadcasts in a Zigbee communication protocol, and the second transmitter broadcasts in a Bluetooth protocol. The computer 70 then receives the signal and is able to process the data received as desired by the user.

The DMM 68 is capable of measuring various types of parameters, such as current, voltage, resistance, or the like. The data for the parameter measured by the DMM 68 is transferred to the adapter 64 wirelessly because of the DMM optical interface 40 having the transmitter 44 and a receiver 46. The transmission of data between the adapter 64 and the computer 70 is also wireless because of the radio transmitters 52,54 and the interrogator 72.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adapter for providing wireless communication between a multimeter and a computer, comprising:
   a processor;
   a transmitter operable for transmitting signals to a digital multimeter (DMM) from said processor;
   a receiver operable for receiving signals from said digital multimeter, said processor operable for receiving signals from said receiver; and
   at least one radio transmitter operable for providing wireless communication between said processor and said computer such that data measurements obtained by said DMM are transferred wirelessly to said adapter through the use of said receiver and said transmitter, and said data measurements are then transferred wirelessly from said adapter to said computer by said at least one radio transmitter;

an interrogator connected to said computer operable for wireless communication with said at least one radio transmitter, and transferring said data measurements to said computer;
a power source;
a charger/manager having a power supply switch, said charger/manager in electrical communication with said power source for changing the operation of said power source between a stand-by mode and an operational mode; and
a connector operable for connecting said adapter to a device operable for recharging said power source and reprogramming said adapter.

2. The adapter for providing wireless communication between a multimeter and a computer of claim 1, wherein said power source is a battery.

3. The adapter for providing wireless communication between a multimeter and a computer of claim 1, said device operable for recharging said power source and reprogramming said adapter further comprising a load box.

4. The adapter for providing wireless communication between a multimeter and a computer of claim 1, further comprising:
a multiplexer in electrical communication with said processor and said at least one radio transmitter; and
a universal serial bus (USB) to universal asynchronous receive/transmit (UART) bridge, said USB to UART bridge operable for translating data received through said connector to said multiplexer, said multiplexer operable to switch communication of said processor between said USB to UART bridge and said at least one radio transmitter.

5. An adapter for providing wireless communication between a multimeter and a computer, comprising:
a processor;
a transmitter operable for transmitting signals to a digital multimeter (DMM) from said processor;
a receiver operable for receiving signals from said digital multimeter, said processor operable for receiving signals from said receiver;
a first radio transmitter operable for transmitting wireless communication between said processor and said computer such that data measurements obtained by said DMM are transferred wirelessly to said adapter through the use of said receiver and said transmitter, and said data measurements are then transferred wirelessly from said adapter to said computer by said first radio transmitter, wherein said first radio transmitter is operable for broadcasting in at least one communication protocol, said communication protocol being one selected from the group consisting of Zigbee, Wifi, infared, Infrared Data Association (IrDA), Bluetooth, Ultra-wideband (UWA), and Z-Wave; and
a second radio transmitter operable for transmitting wireless communication between said processor and said computer such that data measurements obtained by said DMM are transferred wirelessly to said adapter through the use of said receiver and said transmitter, and said data measurements are then transferred wirelessly from said adapter to said computer by said second radio transmitter, wherein said second radio transmitter is operable for broadcasting in at least one communication protocol, said communication protocol being one selected from the group consisting of Zigbee, Wifi, infared, Infrared Data Association (IrDA), Bluetooth, Ultra-wideband (UWA), and Z-Wave and said second radio transmitter transmits data in a different communication protocol compared to said first radio transmitter.

6. The adapter for providing wireless communication between a multimeter and a computer of claim 1, further comprising an optical interface, said receiver and said at least one radio transmitter being part of said optical interface.

7. An adapter for providing wireless communication between a multimeter and a computer, comprising:
an optical interface having a transmitter and a receiver operable for providing wireless communication between said adapter and a digital multimeter (DMM), and for recording at least one data measurement from said DMM;
at least one radio transmitter operable for wirelessly transferring said at least one data measurement from said adapter to a computer;
a processor operable for controlling the operation of said optical interface, and transferring data received by said optical interface to said at least one radio transmitter
a universal serial bus (USB) to universal asynchronous receive/transmit (UART) bridge; and
a multiplexer in electrical communication with said processor, said at least one radio transmitter, and said USB to UART Bridge, said multiplexer operable for switching communication from said processor between said at least one radio transmitter and said USB to UART Bridge.

8. The adapter for providing wireless communication between a multimeter and a computer of claim 7, further comprising an interrogator connected to said computer, said interrogator operable for wirelessly receiving said at least one data measurement from said at least one radio transmitter.

9. The adapter for providing wireless communication between a multimeter and a computer of claim 7, wherein said at least one radio transmitter is operable for broadcasting in at least one communication protocol.

10. The adapter for providing wireless communication between a multimeter and a computer of claim 9, said communication protocol being one selected from the group consisting of Zigbee, Wifi, infared, Infrared Data Association (IrDA), Bluetooth, Ultra-wideband (UWA), and Z-Wave.

11. An adapter for providing wireless communication between a multimeter and a computer, comprising:
an optical interface having a transmitter and a receiver operable for providing wireless communication between said adapter and a digital multimeter (DMM), and for recording at least one data measurement from said DMM;
at least one radio transmitter operable for wirelessly transferring said at least one data measurement from said adapter to a computer;
a processor operable for controlling the operation of said optical interface, and transferring data received by said optical interface to said at least one radio transmitter
a battery;
a charger/manager having a power supply switch, said charger/manager in electrical communication with said battery for changing the operation of said battery between a stand-by mode and an operational mode; and
a connector in electrical communication with said charger/manager, said connector operable for connection with a device operable to charge said battery and reprogram said processor.

12. The adapter for providing wireless communication between a multimeter and a computer of claim 11, said device operable to charge said battery and reprogram said processor further comprising a load box.

13. An adapter for providing wireless communication between a multimeter and a computer, comprising:
- an optical interface having a transmitter and a receiver operable for providing wireless communication between said adapter and a digital multimeter (DMM), and for recording at least one data measurement from said DMM;
- at least one radio transmitter operable for wirelessly transferring said at least one data measurement from said adapter to a computer;
- a processor operable for controlling the operation of said optical interface, and transferring data received by said optical interface to said at least one radio transmitter
- a first radio transmitter operable for wirelessly transferring said at least one data measurement from said adapter to a computer and receiving data from said processor, and broadcasting said at least one data measurement to said computer in a communication protocol; and
- a second radio transmitter operable for wirelessly transferring said at least one data measurement from said adapter to a computer and receiving said at least one data measurement from said processor, and broadcasting said at least one data measurement to said computer in a communication protocol, said communication protocol of said second radio transmitter being different from said communication protocol of said first transmitter.

14. An adapter for providing wireless communication between a multimeter and a computer, comprising:
- a processor;
- an optical interface in electrical communication with said processor, and controlled by said processor;
- a transmitter operable for wirelessly transmitting data from said optical interface to a digital multimeter (DMM), said DMM operable for measuring a desired parameter;
- a receiver which is part of said optical interface, said receiver being operable for wirelessly receiving data from said digital multimeter;
- at least one radio transmitter in electrical communication with said processor and controlled by said processor such that said at least one radio transmitter wirelessly transmits a signal to said computer, and said computer is operable to record said desired parameter;
- a multiplexer in electrical communication with said processor and said at least one radio transmitter;
- a universal serial bus (USB) to universal asynchronous receive/transmit (UART) bridge in electrical communication with said multiplexer; and
- a connector operable for connecting to a load box suitable for charging a battery and reprogramming said adapter, said USB to UART bridge operable for providing communication between said load box connected to said connector and said processor, said multiplexer operable for switching communication from said processor between said at least one radio transmitter and said USB to UART Bridge.

15. The adapter for providing wireless communication between a multimeter and a computer of claim 14, further comprising an interrogator connected to said computer, said interrogator operable for wireless communication with said at least one radio transmitter such that said desired parameter is received by said interrogator and transferred to said computer.

16. The adapter for providing wireless communication between a multimeter and a computer of claim 14, further comprising a charger/manager having a power supply switch, said charger/manager in electrical communication with said battery for changing the operation of said battery between a stand-by mode and an operational mode.

17. The adapter for providing wireless communication between a multimeter and a computer of claim 14, said wherein said at least one radio transmitter is operable for broadcasting in at least one communication protocol.

18. The adapter for providing wireless communication between a multimeter and a computer of claim 17, said communication protocol being one selected from the group consisting of Zigbee, Wifi, infared, Infrared Data Association (IrDA), Bluetooth, Ultra-wideband (UWA), and Z-Wave.

19. The adapter for providing wireless communication between a multimeter and a computer of claim 17, said at least one radio transmitter further comprising:
- a first radio transmitter operable for broadcasting a signal in a first communication protocol; and
- a second radio transmitter operable for broadcasting a signal in a second communication protocol, said second communication protocol different from said first communication protocol.

* * * * *